United States Patent

Matani

Patent Number: 5,343,101
Date of Patent: Aug. 30, 1994

[54] PLASTIC AIR DEFLECTOR FOR ROTATING DYNAMOELECTRIC MACHINE

[75] Inventor: Madhavsinh A. Matani, Chesterfield, Mo.

[73] Assignee: MagneTek Century Electric, Inc., St. Louis, Mo.

[21] Appl. No.: 840,844

[22] Filed: Feb. 25, 1992

[51] Int. Cl.⁵ .......................... H02K 9/00; H02K 9/06
[52] U.S. Cl. ........................ 310/58; 310/62; 310/63
[58] Field of Search ............ 310/52, 53, 58, 59, 310/60 R, 62, 63, 89, 90, 64

[56] References Cited

U.S. PATENT DOCUMENTS

| | | | |
|---|---|---|---|
| 2,315,653 | 4/1943 | Pollard et al. | 310/52 |
| 2,357,923 | 9/1944 | Anderson | 310/60 R |
| 2,545,855 | 3/1951 | Luenberger | 310/58 |
| 3,060,860 | 10/1962 | Schaefer | 310/90 |
| 3,243,617 | 3/1966 | Cunningham | 310/63 |
| 3,610,173 | 3/1971 | Wightman | 310/60 |
| 3,761,748 | 9/1973 | Baumann et al. | 310/58 |
| 3,800,173 | 3/1974 | Rosenberry, Jr. | 310/59 |
| 4,009,405 | 2/1977 | Gleichman | 310/58 |
| 4,072,872 | 2/1978 | Gleichman | 310/53 |
| 4,208,599 | 6/1980 | Armor et al. | 310/53 |
| 4,268,767 | 5/1981 | Domitrovic et al. | 310/53 |
| 4,270,064 | 5/1981 | Glandorf et al. | 310/64 |
| 4,315,173 | 2/1982 | Calfo et al. | 310/53 |
| 4,443,723 | 4/1984 | Ohkuho | 310/53 |
| 4,659,950 | 4/1987 | Gotoh | 310/59 |
| 4,766,337 | 8/1988 | Parkinson et al. | 310/58 |

FOREIGN PATENT DOCUMENTS 0978936 6/1964 France ................ 310/60 R

Primary Examiner—Steven L. Stephan
Assistant Examiner—C. LaBalle
Attorney, Agent, or Firm—Seldon & Scillieri

[57] ABSTRACT

A one-piece, plastic, integrally formed deflector for a motor includes a generally annularly shaped shroud portion, an axially offset generally annularly shaped mounting ring portion, and four generally axially extending webs interconnecting them. The deflector may be conveniently mounted to an end bracket with a screw placed through a mounting hole in the mounting ring located at each web such that as the end bracket is assembled to the motor, the shroud portion closely fits nearly adjacent the rotating rotor blades and the inside of the motor shell to restrict the flow of ventilating air through the motor and prevent its re-circulation past the blades.

14 Claims, 2 Drawing Sheets

PLASTIC AIR DEFLECTOR FOR ROTATING DYNAMOELECTRIC MACHINE

BACKGROUND AND SUMMARY OF THE INVENTION

Rotating dynamoelectric machines, such as motors and generators (hereinafter motors), have a tendency to build heat up internally during operation. One of the many techniques used to reduce this heat build-up is the circulation of air within the housing or shell thereof and past the windings wherein the heat is generated. In some designs, the rotor carries a plurality of end blades, typically die cast, which propel the air much as a fan propels the air as it is turned. Also in the prior art, there are many designs for baffles, shrouds, and the like for directing the flow of air from a series of ventilating holes in the shell, past the blades, through the windings, and out the other end of the motor. Many different designs are utilized in the prior art in order to accommodate many different air paths as might be considered desirable by the designer. However, these baffles, deflectors and the like can be constructed of multiple pieces, some of which are rotating and others of which are stationary in order to maximize the effect of the rotating blades in drawing cooling air through the shell.

As motors are generally available from a wide variety of manufacturers, and these many different devices are sometimes considered to be functionally equivalent, the cost thereof can be a significant factor in the selection of one competitor's device over another's. Therefore, there has been significant attention paid to many of the various design details, including both motors and generators, over the years.

To solve the problems associated with multi-piece deflectors, including not only the required close manufacturing tolerances of those designs as well as the increased cost thereof in both the manufacture and installation thereof, the inventors herein have succeeded in designing and developing a one-piece, integrally formed, plastic air deflector which can be conveniently mounted to an end bracket of a motor by a mounting ring. The one-piece, integral, plastic construction of the deflector greatly reduces the cost not only of the piece part, but also minimizes installation cost as the deflector is mounted with four screws into an end bracket for the motor. In addition to a generally annularly shaped mounting ring, the deflector includes an axially displaced generally annularly shaped shroud with four webs extending between the inner circumference of the shroud and the outer circumference of the mounting ring. The deflector is oriented within the shell to be adjacent the holes therein through which cooling air passes.

As the webs occupy very little of the space between the shroud and the mounting ring, little interference or blockage of air flow is caused. Thus, cooling air readily flows through the ventilating holes, through the deflector by flowing past the stationary webs, and the air is then drawn into the central portion of the motor by rotating rotor blades which fit and rotate closely against the shroud portion of the deflector. The shroud not only fits closely against the rotor blades, but extends substantially to the inner circumference of the shell, with four notches therethrough for insertion of the thru-bolts which join the end brackets to the shell, as known in the art. This positioning of the shroud prevents re-circulation of the air around the blades which would interfere with the cooling action of the air as it circulates through the motor.

While the major advantages and features of the present invention have been described above, a more complete and thorough understanding of the invention may be attained by referring to the drawings and description of the preferred embodiment which follow.

DETAILED DESCRIPTION OF THE PREFERRED EMBODIMENT

Figure 1:
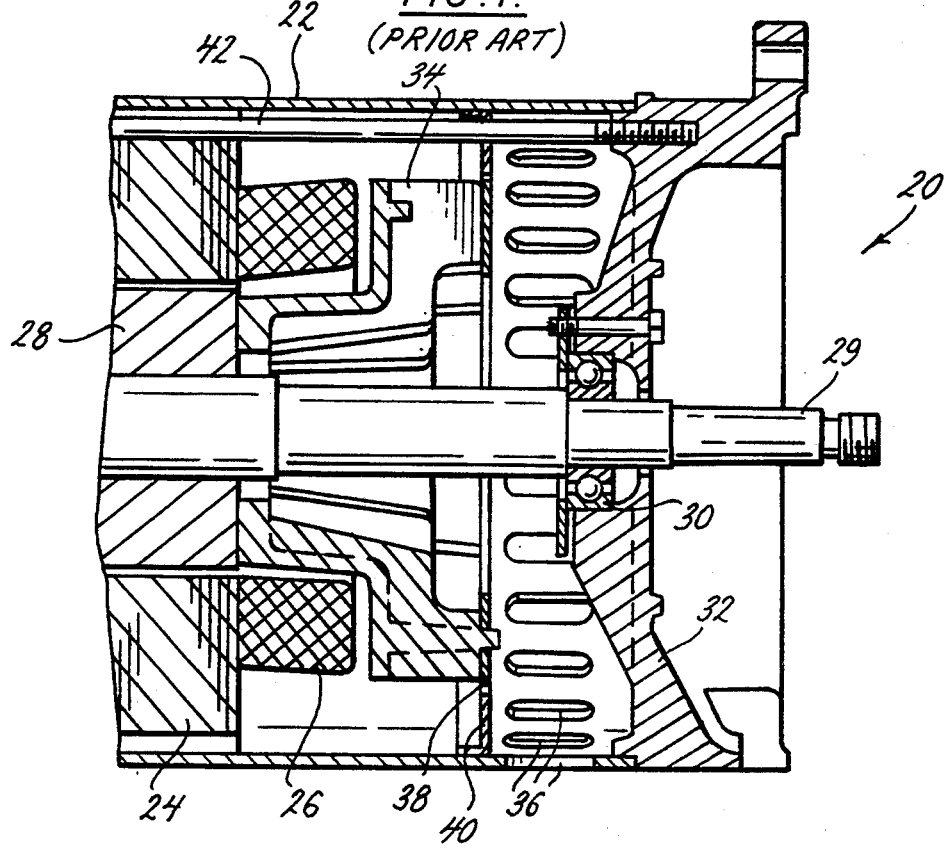
FIG. 1 is a partial cross-sectional view of a motor incorporating a deflector of a typical prior art design.

A motor 20 is shown in FIG. 1 and includes therein a generally cylindrically shaped shell 22 which surrounds a stator 24 having stator windings 26 with a rotor 28 rotatably mounted inside stator 24 through a drive shaft 29 supported by an end bearing 30 in end bracket 32, all as well known in the art. The rotor 26 includes a plurality of axially extending, typically cast, fan blades 34 for drawing cooling air through the ventilating holes 36 in shell 22. The fan blades 34 may be a separate part, metal or plastic, assembled on a shaft.

A prior art deflector construction includes a steel shroud 38 which is typically peened over the die cast end ring comprising blades 34, or blades on the shaft mounted fan, such that it rotates with the rotor 26 as the motor 20 is operated, and a steel deflector 40 which is typically pressed into the shell 22. With this construction, the shroud member 38 must have close manufacturing tolerances in order to closely fit against but clear the inside circumference of the deflector 40. Furthermore, they must be axially located to prevent air from re-circulating through the minimal spacing between shroud 38 and deflector 40. As might be expected, there is difficulty, which increases the cost, not only in manufacturing the shroud 38 and deflector 40 to close manufacturing tolerances, but also in installing these parts within the shell 22. Still another problem in locating deflector 40 is that it must have holes therethrough so that thru-bolts 42 may conveniently slide therethrough and be secured to end bracket 32, as known in the art. Thus, the deflector 40 not only has to be axially located but also radially located when it is press fit into shell 22. As the shell 22 is typically painted prior to the installation of these parts, paint is typically undesirably peeled during this installation process.

Figure 2:
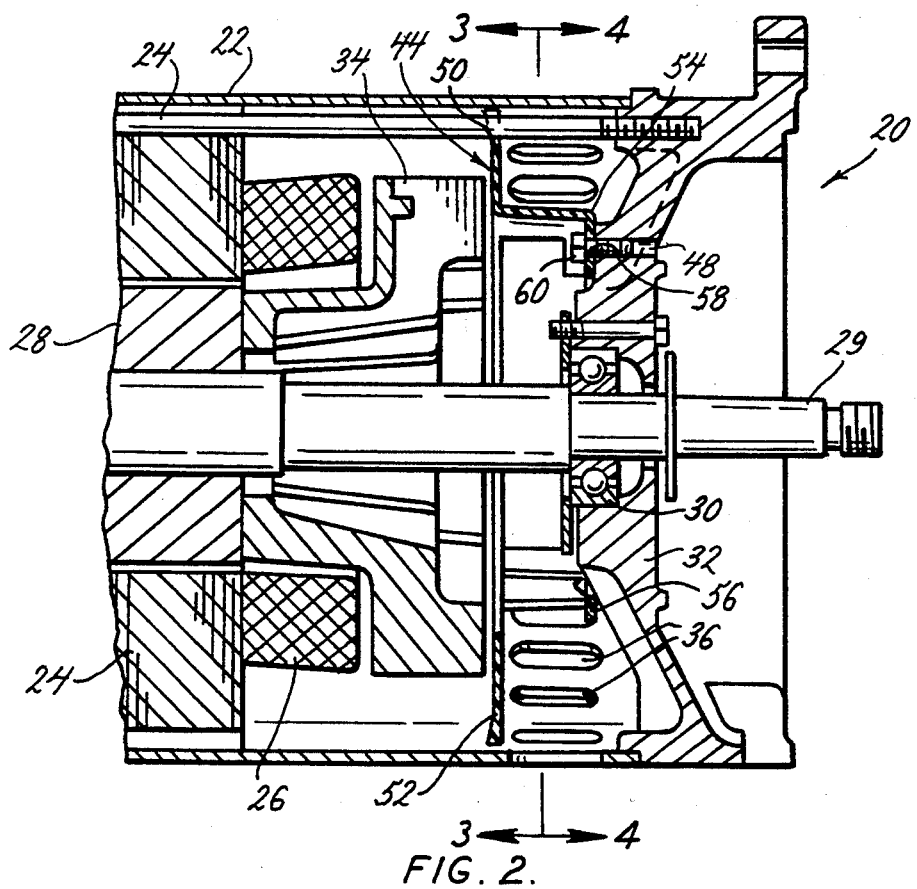
FIG. 2 is a partial cross-sectional view of a motor with the deflector of the present invention installed.
Figure 3:
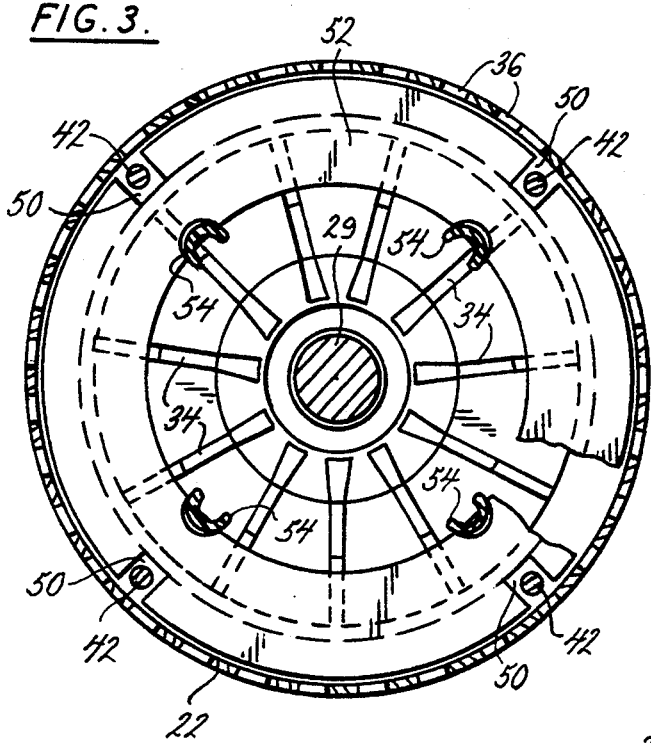
FIG. 3 is a partial cross sectional view taken along the plane of Line 3—3 in FIG. 2 detailing the deflector installed in a motor.

The present invention provides a dramatic improvement over the prior art design and is shown in the remaining figures of the drawings. Its overall installation and construction is shown in FIG. 2 in the same motor design as depicted in FIG. 1. However, instead of the separate parts, a single, one-piece, integral, plastic deflector 44 is conveniently mounted by four screws 60 into the end bracket 32. As the mounting holes 48 are cored directly into the end bracket 32, the holes or notches 50 in the deflector 44 may be very accurately located and reliably lined up upon installation of the deflector 44 to the end bracket 32. Generally, the deflector 44 includes a shroud portion 52 which is aligned closely to the rotating edge of blades 34 and against the inside surface of shell 22 to prevent the re-circulation of air past the blades 34, around the shroud 52 and back through the blades 34. This prevents the over-heating of air and improves the operation and efficiency of blades 34 as they draw air through the ventilating holes 36, as previously described. Four webs 54 connect the shroud portion 52 with the mounting ring portion 56 wherein the mounting holes 58 are positioned through which screws 60 are inserted to mount the deflector 44 to end bracket 32.

Figure 6:
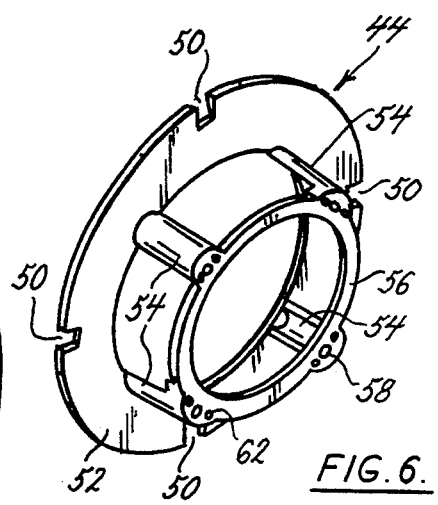
FIG. 6 is a perspective of the deflector of the present invention.
Figure 7:
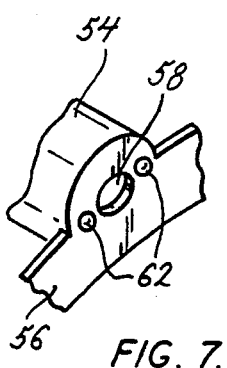
FIG. 7 is an enlarged partial perspective of a mounting hole in the mounting ring of the deflector.
Figure 4:
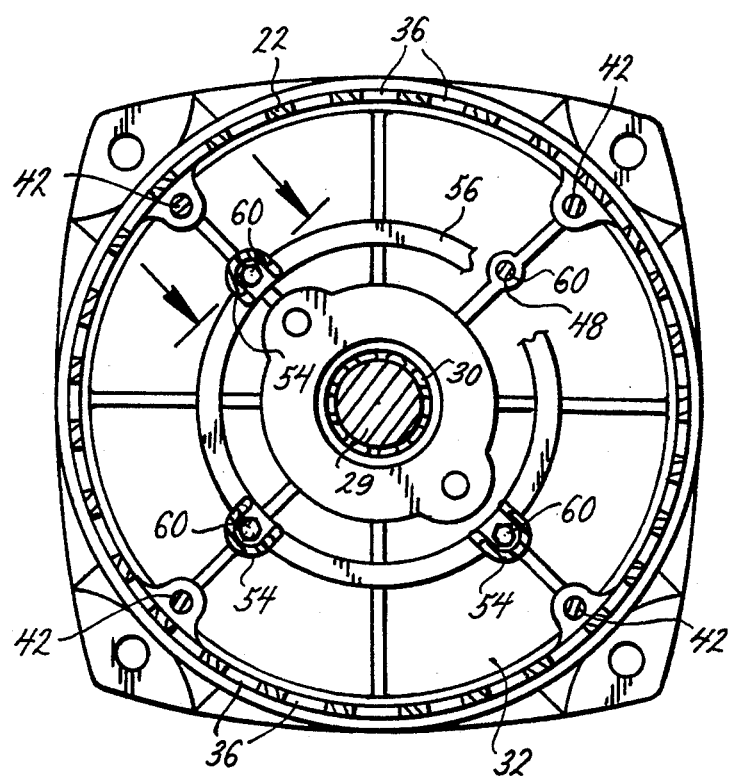
FIG. 4 is an end view of the motor detailing the deflector mounting to the end bracket.
Figure 5:
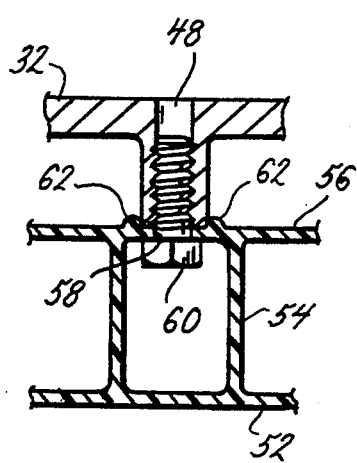
FIG. 5 is a partial cross-sectional view of the deflector taken along the plane of line 5—5 in FIG. 4.

A more detailed depiction of the construction of the deflector 44 is found in the remaining figures of the drawings. For example, as shown in FIG. 6, the shroud portion 52 is generally comprised of an annulus with an inner circumference having substantially the same radius as the outer circumference of mounting ring 56. Shroud 52 is generally co-axial with mounting ring 56. The four webs 54 which join shroud 52 and mounting ring 56 are generally arcuate shaped in cross-section and generally extend from the inner edge or circumference of shroud 52 to the outer edge or circumference of mounting ring 56. At each juncture between a web 54 and the mounting ring 56, a mounting hole 58 is located, as well as a pair of locating nibs 62 for locating deflector 44 on end bracket 32. Thus, deflector 44 may be very accurately located and conveniently installed to end bracket 32 prior to its assembly to shell 22 and attachment with thru-bolts 42 through notches 50. As the thru-bolts are attached to holes drilled and tapped in end bracket 32 itself, notches 50 are reliably positioned accurately by the simple mounting of deflector 44 to end bracket 32 to accommodate the ready insertion of thru-bolts 42.

With the deflector 44 of the present invention, a single, one-piece, integrally formed, plastic part may be pre-assembled to an end bracket 32 and conveniently installed as the end bracket 32 is installed to the motor 20.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a rotating dynamoelectric machine, said machine including a generally cylindrically shaped shell having a plurality of ventilating holes to permit the free passage of cooling air therethrough, a stator having a plurality of windings, a rotor having a plurality of windings located within said stator and a plurality of blades for blowing air axially through and past said stator windings for cooling purposes, means for supporting said rotor to permit its free rotation within said stator, and a pair of end brackets enclosing the ends of said shell, the improvement comprising:

a one-piece deflector for attachment solely to one of said end brackets, said deflector having at least one opening through which cooling air is drawn and means for deflecting the cooling air drawn through said ventilating holes and said one opening directly to said rotor blades and axially through said machine and substantially preventing the diversion of said cooling air therefrom, said deflector including a shroud portion for substantially surrounding a rotating edge of said blades to thereby define a restricted flow path for said cooling air, a mounting ring portion to facilitate the attachment of said deflector to bracket, and a connector portion extending between said shroud portion and said mounting ring portion.

2. The deflector of claim 1 wherein said connector portion has means for defining said one opening for air flow therethrough to permit the flow of the cooling air between said ventilating holes and said rotor blades.

3. The deflector of claim 2 wherein said connector portion comprises a plurality of webs extending between said shroud portion and said mounting ring portion.

4. The deflector of claim 3 wherein said shroud portion comprises a first annulus sized to fit closely to the inside of the shell, and said ring portion defines a second annulus, said first and second annuluses being axially offset.

5. The deflector of claim 4 wherein said second annulus has an outer circumference with a radius substantially equal to the radius of the inner circumference of said first annulus, and said webs extend between said second annulus outer circumference and said first annulus inner circumference.

6. The deflector of claim 5 wherein each of said webs has a generally arcuate cross-sectional shape, and a mounting hole is located substantially at the point each of said webs joins said second annulus.

7. The deflector of claim 6 wherein said connecting portion includes four webs.

8. The deflector of claim 7 wherein said deflector is made from plastic.

9. In a rotating dynamoelectric machine, said machine having a generally cylindrical shell surrounding a stator and a rotor, and an end bracket for enclosing an end of said shell, said rotor being rotatably supported within said stator and having a plurality of blades for drawing cooling air through said shell axially past said stator to the opposite end of said machine, the improvement comprising:

a one-piece, integrally formed, deflector for stationary mounting within said shell, said deflector having an opening therethrough to direct the flow of said cooling air through said blades and axially through said machine, and prevent the re-circulation of said cooling air around said blades, said deflector comprising means for substantially sealing a rotating edge of said blades to said shell to thereby prevent the recirculation of air around said blades, said deflector further comprising a mounting ring, and means spaced around the circumference of said mounting ring for securing said deflector to said end bracket to thereby mount said deflector in said shell.

10. The deflector of claim 9 wherein said deflector further comprises means connecting said sealing means and said mounting ring, said connection means permitting the free flow of cooling air therebetween.

11. In a rotating dynamoelectric machine, said machine having a generally cylindrical shell surrounding a stator and a rotor, said rotor being rotatably supported within said stator by a pair of bearings, each of said bearings being supported by a bearing end plate, said rotor having a plurality of blades for drawing cooling air through said shell and axially past said stator, the improvement comprising a one-piece plastic air deflector, said deflector comprising a generally annularly shaped shroud, a generally annularly shaped mounting ring, said shroud and mounting ring being offset axially, and a plurality of generally radially extending webs interconnecting said shroud and mounting ring for defining a plurality of openings through which the cooling air is drawn.

12. The deflector of claim 11 wherein said mounting ring includes a mounting hole located near each point at which a web is joined, said mounting holes providing means for mounting said deflector within said shell.

13. The deflector of claim 12 wherein each of said webs extends between the inner edge of said shroud and the outer edge of said mounting ring, the radius of each of said shroud inner edge and said mounting outer edge being substantially equal.

14. The deflector of claim 13 wherein said shroud and said mounting ring are substantially co-axial.

* * * * *